(12) United States Patent
Gibson et al.

(10) Patent No.: US 7,432,317 B2
(45) Date of Patent: Oct. 7, 2008

(54) CELLULOSE REINFORCED RESIN COMPOSITIONS WITH WAX BLEND

(75) Inventors: Brian L. Gibson, Bloomfield, NJ (US); Francis Sim, Allentown, PA (US); James E. Garft, Yardley, PA (US)

(73) Assignee: Honeywell International Inc, Morristown, NJ (US)

( * ) Notice: Subject to any disclaimer, the term of this patent is extended or adjusted under 35 U.S.C. 154(b) by 337 days.

(21) Appl. No.: 10/540,150

(22) PCT Filed: Mar. 12, 2004

(86) PCT No.: PCT/US2004/007657

§ 371 (c)(1),
(2), (4) Date: Jun. 21, 2005

(87) PCT Pub. No.: WO2004/083301

PCT Pub. Date: Sep. 30, 2004

(65) Prior Publication Data

US 2006/0094802 A1    May 4, 2006

Related U.S. Application Data

(60) Provisional application No. 60/454,834, filed on Mar. 14, 2003.

(51) Int. Cl.
*C08L 1/00* (2006.01)
*C08L 27/06* (2006.01)
*C08L 91/06* (2006.01)
*C08L 91/08* (2006.01)

(52) U.S. Cl. .............. 524/9; 524/62; 524/277; 524/479; 524/487; 524/491

(58) Field of Classification Search .......... 524/9, 524/62, 277, 479, 487, 491
See application file for complete search history.

(56) References Cited

U.S. PATENT DOCUMENTS

| | | | |
|---|---|---|---|
| 3,234,197 A | 2/1966 | Baum | |
| 3,322,711 A | 5/1967 | Bush et al. | |
| 3,972,962 A | 8/1976 | Williams et al. | |
| 4,032,473 A | 6/1977 | Berg et al. | |
| 4,132,691 A * | 1/1979 | Ejk | 524/178 |
| 4,454,313 A | 6/1984 | Okitsu et al. | |
| 4,459,388 A | 7/1984 | Hettche et al. | |
| 4,607,072 A | 8/1986 | Su | |
| 4,681,975 A | 7/1987 | Hasegawa et al. | |
| 4,812,504 A | 3/1989 | Su | |
| 5,039,740 A | 8/1991 | Anderson et al. | |
| 5,536,462 A * | 7/1996 | Hawrylko | 264/211.21 |
| 5,621,033 A | 4/1997 | Lindner | |
| 6,060,565 A | 5/2000 | Deckers et al. | |
| 6,103,791 A | 8/2000 | Zehner | |
| 6,210,792 B1 | 4/2001 | Seethamraju et al. | |
| 6,248,813 B1 | 6/2001 | Zehner | |
| 6,485,804 B1 | 11/2002 | Nakamachi et al. | |
| 6,784,230 B1 * | 8/2004 | Patterson et al. | 524/13 |

FOREIGN PATENT DOCUMENTS

JP    63115793 A  *  5/1988

OTHER PUBLICATIONS

Edenbaum, J., Ed., Plastic Additives and Modifiers Handbook, Van Nostrand Reinhold, New York 1992, Chapter 3.

* cited by examiner

*Primary Examiner*—Kelechi C Egwim
(74) *Attorney, Agent, or Firm*—Carrie Beatus

(57) ABSTRACT

The present invention provides an extrudable reinforced resin-containing composition comprising resin capable of plastic flow, reinforcing material, and a lubricant composition comprising oxidized polyethylene wax, ester wax, and amide wax. Also provided are the lubricant composition, and extrusion methods and extruded products based on the present compositions.

24 Claims, No Drawings

CELLULOSE REINFORCED RESIN COMPOSITIONS WITH WAX BLEND

CROSS REFERENCE TO RELATED APPLICATIONS

This application claims the priority of PCT Application No. PCT/US04/07657 filed on Mar. 12, 2004, and U.S. Provisional Application Ser. No. 60/454,834, filed on Mar. 14, 2003, the contents of which are hereby incorporated by reference.

BACKGROUND OF THE INVENTION

Extrusion feedstock compositions comprising cellulose fiber, for example, wood fiber, and a resin, for example, a thermoplastic resin, for example, polyvinyl chloride resin, are well known. Examples of such compositions are described in U.S. Pat. Nos. 6,103,791 and 6,248,813 to Zehner and U.S. Pat. No. 6,210,792 to Seethamraju et al, which are hereby incorporated by reference. These compositions can be extruded to provide shaped articles, for example, decorative molding for finish carpentry. Compositions based on polyvinyl chloride resins (PVC) are preferred for such applications because of their superior weather-resistant properties over other types of resin compositions.

In general extrusion of material reinforced thermoplastic resin compositions, for example a cellulose/polyvinyl chloride resin composition requires heating an extrudable mixture to a temperature at which it can undergo plastic flow, and then forcing it through a plate containing one or more openings (herein, a "die") which impart a profile shape to the emerging extrudate. As it emerges from the orifice opening, the extrudate is cooled until it becomes rigid, retaining the profile shape. The shaped extrudate is used either in its extruded form, for example, as a decorative molding, or it is cut into convenient length pieces and packaged for use in follow-on processing, for example, as feedstock for an injection or blow molding process.

In general an extrusion feedstock composition, also referred to herein for convenience as "an extrudable composition", is often prepared by combining cellulose fiber and a resin, for example, a thermoplastic resin, for example, polyvinyl chloride (PVC) resin, and other constituents (also called additives) which effect the properties of the composition and the extrudate, for example, a lubricant. Other examples of constituents which may be included in an extrudable composition, for example, one containing a PVC resin, are those described in the Handbook of Plastic Materials and Technology, Ed. I. Rubin, Wiley-Interscience, John Wiley & Sons, Inc. New York, 1990 and Plastics Additives and Modifiers Handbook, Ed. J. Edenbaum, Van Nostrand Reinhold, New York 1992, Chapter 3, each of which is incorporated herein by reference. Examples of additional constituents (additives) include fillers (for example, calcium carbonate), processing aids (for example acrylic copolymers), and stabilizers for imparting heat stability to the composition during the extrusion process (for example, tin based stabilizer such as TM281® from Rohm & Haas).

Once combined, the constituents of the composition are "fused," that is, subjected to heating and blending until there is formed a plastic composition which is substantially homogeneous. The term "fusion" is applied to this process because in heating and blending the boundaries of the individual granules of the constituents become indistinguishable, thus, "fused". The various additives and the amounts of the additives used influence the properties of the composition and its performance during and after extrusion. Examples of properties effected include the processability of the material during extrusion or in follow-on processes in which the extruded material is employed and the physical and mechanical properties of an extrudate made from the composition. Examples of physical properties are the dimensional stability and surface gloss of the extrudate product prepared from the extrudable composition. Examples of mechanical properties include the flexural and tensile strength of an extrudate prepared from the extrudable composition. Examples of extrudability properties of the extrudable composition include the extrusion rate of the composition for a given extruder torque setting or value of head pressure Dimensional stability and surface appearance (surface gloss) are characteristics that may affect the commercial value of an extruded product and hence of the processes and the components used to make the extruded product. Dimensional stability is assessed by observing the amount by which an extruded shape expands during solidification after it emerges from the die of an extrusion apparatus. The amount of expansion is sometimes referred to as die swell. Surface gloss is measured in accordance with known standard measurements, for example, ASTM standards D-2523-95 and D2457-97

The tensile and flexural strength of extruded articles are important to the commercial value of an extruded product also. These mechanical properties can be effected by the type and amount of lubricant included in the extrudable composition preparatory to producing the extruded article. These mechanical properties can be measured in accordance with known standard measurements, for example ASTM standards D 638 and D 6109 for measurement of the tensile and flexural strength of an extruded article, respectively For a given extrudable composition, it is generally possible to increase the rate at which material is extruded. However, such extrusion rate increases have practical limitations. For example, it is possible to obtain extrusion rate increases by operating the extruder at a higher temperature and/or at a higher head pressure. However, at some point of increasing extruder temperature the extrudable composition will generally begin to scorch, and the surface and structural qualities of the extrudate will begin to degrade. Furthermore, as the head pressure or extruder torque is increased, a point is generally reached at which the dimensional stability and/or surface condition of the extruded material is unacceptable. These process limitations have created practical limits on the rate at which prior compositions could be extruded.

Another mechanism that is at least theoretically available to achieve higher extrusion rates is to increase the amount and/or type of lubricant incorporated into the extrudable composition. However, it is also possible that increasing the amount of the lubricant or changing the type of lubricant can have deleterious effects on the extruded product, for example, compromising one or more of the inherent physical and/or mechanical properties of the product (extrudate) and/or on other aspects of the extrusion process.

Reduction in the tensile strength of an extrudate is an example of one inherent mechanical property of an extrudate which may be compromised by increasing the amounts of certain lubricants or other additives. In particular, increasing amounts of certain lubricants known as external lubricants in reinforced resin extrudates, for example, cellulose reinforced PVC extrudates, can reduce the adhesion of the PVC resin to the reinforcing material, negatively impacting the strength of the extrudate and its surface appearance. Also, increased amounts of external lubricant may negatively impact not only the strength of the extrudate but may also increase the fusion time, which increases the overall processing time.

Applicants have thus come to recognize the need for cellulose reinforced extrudable compositions, particularly extrudable PVC-based compositions, having one or more of those desirable extrusion characteristics associated with high levels of lubricant while reducing or substantially eliminating one or more or the adverse effects that would otherwise be associated with a high level of lubricant. The present methods and extrudable compositions meet this and other needs.

SUMMARY OF THE INVENTION

One aspect of the present invention provides extrudable compositions; more preferably, cellulose reinforced extrudable compositions comprising a thermoplastic resin for example, polyvinyl chloride (PVC), and a lubricant composition comprising at least one oxidized polyethylene wax, at least one ester wax, and at least one amide wax. Other additives may also be present in the extrudable compositions of the present invention. Applicants have discovered that the presence of a lubricant composition of the present invention in a cellulose-containing extrudable PVC composition, in preferred embodiments, results in an extrudable composition which exhibits a highly desirable yet difficult to obtain combination of properties. For example, in certain preferred embodiments the present extrudable compositions are capable of being extruded at advantageously high extrusion rates, and yet provide extrudate of relatively high tensile strength and/or high flexural strength and/or high surface gloss.

In preferred embodiments, the extrudable composition of the present invention comprises an amount of the present lubricant composition effective to achieve one or more of the following characteristics relative to the extrudable composition without the lubricant composition (assuming all other extrusion parameters remain substantially constant): (i) decreased extrusion pressure for a given die and extrusion rate; (ii) reduced fusion temperature; (iii) reduced amount of stabilizer needed to achieve the same degree of stability; (iv) increased tensile and/or flexural strength of an article formed from the extrusion of the extrusion mixture; or (v) visibly reduced surface roughness of an article formed from the extrusion of the extrusion mixture.

The present invention also includes as another aspect a lubricant composition comprising at least one oxidized polyethylene wax, at least one ester wax, and at least one amide wax. Other additives may be included in the present lubricant compositions.

Another aspect of the present invention involves processes for extruding a cellulose reinforced thermoplastic composition, preferably a polyvinyl chloride-based composition. The process preferably comprises:

a) providing an extrudable thermoplastic composition comprising at least one thermoplastic polymer and a lubricant composition comprising at least one oxidized polyethylene wax, at least one ester wax, and at least one amide wax; and b) extruding said extrudable mass to form a shaped article.

The present lubricant composition is preferably present in the present extrudable composition in an amount effective to improve the extrudability of the extrudable composition, as measured relative to the extrudability of the extrudable composition in the absence of the lubricant composition, preferably by at least about 10 percent, more preferably by at least about 20 percent, and even more preferably at least about 30 percent as measured for a single property, preferably with no substantial deleterious effect on the extrudability properties of the composition or on the properties of commercial interest of the extrudate produced therefrom. More preferably, as measured relative to the extrudability of the extrudable mass in the absence of the lubricant composition, the lubricant composition is present in an amount effective to improve, by at least about 1 percent, more preferable by more than about 2 percent, and more preferably by more than about 5 percent, two or more properties associated with the extrudability of the composition and/or the commercial value of an extrudate product extruded therefrom with no substantial deleterious effect on any other of those properties. The extrudability of an extrudable mass can be measured by any one of several characteristics of the extrudable mass, as described in detail hereinafter. Also described in detail hereinafter is the measurement of several aspects of commercial value of extrudate product prepared from an extrudable mass.

Another aspect of the present invention provides extruded compositions formed from the extrudable composition of the present invention and/or in accordance with the process of the present invention.

According to another aspect of the present invention, shaped articles are provided based upon and/or formed using the extrudable compositions and/or the extrusion methods of the present invention.

DETAILED DESCRIPTION OF PREFERRED EMBODIMENTS

Although it is contemplated that the present invention will have the greatest applicability in connection with extrusion of thermoplastic polymers reinforced with cellulose materials, for example, PVC polymers (also sometimes referred to herein for convenience as PVC resin) reinforced with wood fiber, it is believed that it will also have applicability to other extrudable compositions containing a reinforcing material. For example, ram extrusion of reinforced polymer compositions containing one or more polymers that are not strictly thermoplastic, such as polytetrafluoroethylene (PTFE), may be beneficially affected by the present invention. Therefore, the term "extrudable composition" is used herein to refer not only to compositions that contain polymers having thermoplastic properties reinforced with cellulose reinforcing material, but also those polymers that are readily extrudable and/or behave similar to thermoplastic polymers with respect to extrusion processes and which are combined with a reinforcing material having properties similar to those of cellulose reinforcing material. Compositions of such extrudable polymers, whether thermoplastic or otherwise, and such reinforcing materials, whether cellulose or otherwise, are sometimes referred to herein for convenience as reinforced resins.

The Methods

The present invention is directed in one aspect to methods of forming shaped articles from an extrudable composition. Generally, the first step is to provide an extrudable composition in accordance with the present invention. Although it is contemplated that the extrudable composition of the present invention may be provided by any means known in the art, it is generally preferred that the extrudable composition is formed by combining at least a resin, a reinforcing material, and a specific combination of components which together have a beneficial lubricating effect on the extrudable composition. This combination of components may also be provided as a separate lubricant composition according to certain aspects of the present invention.

As is known in the art, the requirements of an extrudable composition vary widely depending on the equipment being used and the desired properties of the extrudate, among other factors, and all such extrudable compositions are within the scope of the present invention. Generally, these conditions include mixing the resin, the combination of lubricant components of the present invention, and one or more other components that may be present. Preferably, the blending step causes shear heating within the composition, and the combination of shear and heat cause the individual particles of the composition to soften and fuse, creating a substantially homogeneous mass. At the point of fusing (fusion point), the identity of individual particulates in the composition is preferably substantially lost.

When such heating and blending is performed under known standard testing conditions, the period of blending required to reach the fusion point is referred to as the "fusion time." Generally, at the fusion point, the viscosity of the composition is at a maximum, and it is at about this same point that a maximum will occur in the torque required to blend the mass. The torque maximum is related to the fusion viscosity and is reported as fusion torque. With continued blending, it is expected that the viscosity of the composition, and the torque required to blend the composition, will decrease to a relatively steady state condition. The steady state value is referred to as the equilibrium viscosity, the temperature of the composition at this point is referred to as the equilibrium temperature, and the torque required to blend the composition at this point is referred to as equilibrium torque. With further continued blending, it is expected that the composition would begin to cross-link and the viscosity of the composition, and hence the blending torque, would begin to rise. The elapsed time between the fusion point and the beginning of a measurable rise in viscosity due to cross-linking is referred to as the stability time.

The methods of the present invention also include extruding the provided extrudable composition to form a shaped article. Preferably, the extrusion step includes bringing the extrudable composition of the present invention to a temperature at which it can undergo plastic flow. In preferred embodiments this comprises heating the extrudable composition and forcing the extrudable composition through a die containing one or more openings to impart a profile shape to the emerging extrudate.

One characteristic of the preferred methods of the present invention, and a technique which can be used to measure the extrudability, relates to the amount of force required to force the extrudable composition of the present invention through the die. Preferably, the step of forcing the extrudable composition through a die advantageously requires an amount of force which is lower in comparison to other methods capable of producing an extrudate of comparable quality to that which can be produced in accordance with the present invention. It is preferred to use the combination of lubricant components of the present invention in amounts that together are effective to reduce the force required to force the extrudable composition through the die by at least about 2 percent, more preferably by at least about 5 percent, and even more preferably at least about 10 percent, relative to the force required to force the extrudable composition through the die, when compared to an extrudable mass in which the lubricant composition is absent and with all other conditions being substantially the same. In such embodiments, it also generally preferred that the extrudability properties of the extrudable composition are not substantially degraded, and the physical and mechanical properties of an extrudate product produced from the extrudable mass, as described in detail below, are not substantially degraded. More preferably, an amount of the present lubricant composition is used which provides a reduction in the force required to force the extrudable mass through the die by at least about 2 percent, more prefereably by at least about 5 percent, and even more preferably at least about 10 percent, with a concomitant increase by at least about 1 percent, more preferably at least about 2 percent in the tensile and/or flexural strength of an extrudate product prepared from the extrudable mass.

Although applicants to not intend to be bound by or to any particular theory of operation, in general it is believed that lubricants added to extrudable compositions can have either or both internal and external lubrication properties. In general it is believed that an "internal lubricant" properties effect the processability of the composition by reducing the cohesive forces which impart viscosity to the composition. By lowering these forces, it is believed that the polymer molecules which make up most of the mass of the composition are able to more easily "slip" past each other with greater ease when pressure is applied. In this manner, internal lubricants produce a decrease in the apparent viscosity of the extrudable composition, which is another measure of extrudability. This reduction in cohesive ability of the resin in general also leads to a reduction in the tensile strength of an extrudate product produced from the extrudable composition. The preferred extrudable compositions of the present invention require comparatively lower force to impart plastic flow to the composition, and yet retain or improve the strength of an extrudate product prepared from the extrudable composition prepared in accordance with the invention.

Without being bound by or to any particular theory, it is generally believed that an external lubricant exudes from the mass of an extrudable composition and acts at the interface of the composition and a surface contacting the composition, for example at the point of contact between a die and an extrudable composition. This in turn reduces the force required to overcome flow resistance through a conduit or an orifice (resistance to plastic flow) and also beneficially improves the surface qualities of extrudate, such as an increase in the smoothness of the surface of an extruded article. However, without being bound by or to any particular theory, it is generally believed that an external lubricant also acts at the interface of the resin which substantially comprises an extrudable mass and a reinforcing body within that mass, for example, a wood fiber, lubricating that interface and concomitantly decreasing the interaction between the resin and the fiber. This reduced interaction permits the reinforcing body to "pull out" of the mass more easily, reducing the strength of an extrudate product prepared from such an extrudable mass. Preferably, the lubricant composition of the present invention is used in an amount which provides not only at least about a 2 percent reduction, more preferably at least about a 5 perecent reduction, and more preferably at least about a 10 percent reduction in the resistance of an extrudable composition to plastic flow, but provides at least about a 1 percent, more preferably at least about a 2 percent, and more preferably at least about a 5 percent increase in the flexural and/or tensile strength of an extrudate product prepared from the extrudable composition.

The preferred methods of the present invention are thus capable of providing an extrusion step utilizing a relatively low head pressure and a relatively low torque required to drive the extrusion process, each of which is also a characteristic by which the extrudablity of the extrudable composition can be measured. In certain embodiments, the lubricant composition is preferably present in the composition in an amount effective to reduce the head pressure by at least about 5 percent, more preferably by at least about 10 percent, relative to the head pressure required with all other conditions being substantially the same except for the presence of the lubricant composition, and concomitantly provide at least about a 1 percent, more preferably at least about a 2 percent increase in tensile and/or flexural strength of an extrudate product prepared from the extrudable composition. It is also preferred in certain embodiments that the lubricant composition is present in the extrudable composition in an amount effective to reduce the extrusion torque by at least about 2 percent, more preferably by at least about 5 percent, and even more preferably at least about 10 percent, relative to the extrusion torque required with all other conditions being substantially the same except for the presence of the lubricant composition and concomitantly provide at least about a 1 percent, more preferably at least about a 2 percent increase in tensile and/or flexural strength of an extrudate product prepared from the extrudable composition.

Certain preferred methods of the present invention are thus capable of producing extrusion product having greatly improved dimensional stability. Preferably the lubricant composition is present in the extrudable composition in an amount effective to increase the dimensional stability of the extruded product by at least about 2 percent, more preferably by at least about 5 percent, and even more preferably at least about 10 percent, relative to the dimensional stability of the extruded product with all other conditions being substantially the same except for the presence of the lubricant composition and concomitantly provide at least about a 1 percent, more preferably at least about a 2 percent increase in tensile and/or flexural strength of an extrudate product prepared from the extrudable composition.

Once again, while applicants do not intend to be bound by or to any particular theory, it is believed that the compositions and processes of the present invention are capable of achieving this desirable result because less energy, whether in the form of heat and/or tourque, is required to impart plastic flow to the extrudable composition of the present invention. Importantly, the preferred embodiments of the present invention achieve this advantageous decrease in extrusion energy, which is an indication of improved extrudability, without any substantial sacrifice or deterioration in dimensional stability, and with a concomitant beneficial increase in tensile strength in the extruded product. Dimensional stability is assessed by observing the amount by which an extruded shape expands during solidification after it emerges from a die. Such expansion is sometimes referred to as die swell. Relatively low extrusion temperatures can be employed in accordance with the preferred methods of the present invention, and thus the extruded material solidifies sooner after leaving the die. Furthermore, relatively low extrusion pressures can be developed in accordance with the preferred methods of the present invention, thereby resulting in a lowering of the residual elastic forces within the emerging extrudate. It is believed that the reduction in the amount of energy which must be dissipated by expansion of the material upon emerging from the die manifests as a desirable reduction in die swell.

As discussed above, and again without wanting to be bound by or to any particular theory, an external lubricant reduces the adhesion between an extrudable composition and a surface contacting the composition. When the extrudable composition contains a reinforcing material, the tendency of the resin, which comprises to a substantial degree the bulk of the composition, to adhere to the die during extrusion, can act to pull reinforcing materials from the extrudable composition as it is leaving the die. This tendency yields a surface on an extrudate product which has a grainy or even pitted ("corn cobb") appearance, lowering the commercial value of the extrudate. The quality of the extrudate surface is typically assessed by measuring its reflectivity (gloss). The measurement of gloss is known, for example, ASTM standards D-2523-95 and D2457-97. Preferably the lubricant components of the present invention are present in the extrudable composition in an amount, when taken together, is effective to increase the gloss of the extruded product by at least about 2 percent, more preferably by at least about 5 percent, and even more preferably at least about 10 percent, relative to the gloss of the extruded product with all other conditions being substantially the same except for the presence of the lubricant composition and concomitantly provide at least about a 1 percent, more preferably at least about a 2 percent increase in tensile and/or flexural strength of an extrudate product prepared from the extrudable composition.

It may be found that certain lubricant compositions of the present invention may also act as a surfactant by improving wetting between (and thereby adhesion between) a reinforcing material and the resin component of the composition.

Applicants have discovered lubricant compositions which, in preferred embodiments, provide one or more improved extrudability properties (for example, lowered extrusion torque) and/or one or more improved mechanical and/or physical properties of the extrudate product prepared therefrom (for example, improvement in dimensional stability, surface gloss, tensile strength and flexural strength). The measurement of the various extrudability properties and of surface gloss was discussed above. The measurement of tensile and flexural strength of an extruded article is also known (see, for example, ASTM D 638 and D 6109 respectively, each of which is incorporated herein by reference).

As it emerges from the orifice opening, the extrudate is preferably cooled to produce a relatively rigid article having the basic shape imparted by the die. The shaped extrudate can be used either in its extruded form, for example, as a decorative molding, as fencing members, as siding for buildings, as windows members, as door jambs, as base board, as flashing, and like products, and all such products produced by the present methods or using the present compositions are within the scope of the present invention. The extrudate also may be cut into convenient length pieces and packaged for use in follow-on processing, for example, as feedstock for a injection or blow molding processes.

The present methods in preferred embodiments therefore comprise providing an extrudable composition comprising at least one polyvinyl chloride resin, a cellulose reinforcing constituent, and a lubricant composition of the invention in an amount effective to improve, relative to the properties of the same composition but in the absence the lubricant composition, at least one measure of extrudate quality while preferably maintaining at least one, and preferably a plurality of, extrudability properties. Preferably, the methods of the present invention produce improvement in at least one measure of extrusion performance and in one measure of extrudate quality. More preferably, the present methods exhibit improved performance in one or more of the following: extrudability criteria (such as extrusion torque, head pressure and processing stability); a physical property of an extrudate product prepared from the extrudable composition (such as surface gloss and dimensional stability); a mechanical property of the extruded article (such as flexural strength and tensile strength).

The Compositions

The present invention provides extrudable compositions, additive compositions (including lubricant compositions) useful in the formulation of extrudable compositions, and extruded compositions (including shaped articles) formed from the extrudable compositions of the present invention.

The Extrudable Compositions

The extrudable compositions of the present invention include a resin, a reinforcing material, and a combination of oxidized polyethylene wax, ester wax, and amide wax. In addition, the present extrudable compositions may optionally include other additives, including other lubricant components, impact modifier(s), filler(s), heat stabilizer(s), processing aid(s), binder(s), colorant(s), and other processing aid(s), for example, those described in Handbook of Plastic Materials and Technology, Ed. I. Rubin, Wiley-Interscience, John Wiley & Sons, Inc. New York, 1990 and those described in Plastics Additives and Modifiers Handbook, Ed. J. Edenbaum, Van Nostrand Reinhold, New York 1992, Chapter 3, each of which is incorporated herein by reference.

The preferred extrudable compositions of the present invention exhibit one or more of the following: improved fusion torque, equilibrium torque, fusion time, equilibrium temperature, and processing stability (dynamic heat stability) and/or improvements in the dimensional stability and/or the surface gloss of an extruded article (extrudate product) prepared by extruding the extrudable composition. As mentioned above, these characteristics will generally result in improvements in the characteristics of the extrusion process and or the appearance and utility, thus the commercial value of an extrudate product. Moreover, in addition to providing an improvement in one or more of the aforementioned properties, the inventors have found that addition to an extrudable composition of the combination of lubricant components according to the present invention preferably provides also improved mechanical properties, for example, flexural and tensile strength. In other words, the inventors have found that inclusion of lubricant components in accordance with the present invention, described in detail below, in a reinforced extrudable composition, preferably a composition comprising PVC and a cellulose reinforcing material, can provide compositions which display improved extrudability properties, and/or improvement in the dimensional stability and/or surface gloss of an extrudate product prepared from the extrudable composition in comparison to compositions that are substantially the same except for the lack of the lubricant composition of the invention, and in addition provide for an extrudate product prepared from these compositions which displays improved mechanical properties. In general, with respect to the extrudability properties of the extrudable composition, one or more of the following properties will be improved by including in the composition the lubricant composition of the present invention: (a) greater dynamic heat stability; (b) lower head pressure; (c) lower fusion torque; and (d) lower apparent viscosity. In general, with respect to the physical properties of an extrudate product prepared from an extrudable composition of the invention, improvement in dimensional stability and/or surface gloss of the extrudate may be observed instead of or in addition to the extrudability properties mentioned above. In addition to improvement in any one of or all of the above mentioned extrudability properties of the extrudable composition and the dimensional stability and surface gloss physical properties of an extrudate product, the extrudable compositions of the present invention may display also an improvement in the mechanical properties of tensile strength and/or flexural strength.

The Resin

The extrudable compositions of the present invention may include thermoplastic resin or resins which exhibit thermoplastic properties or which are otherwise extrudable. Thus, it is contemplated that resins such as polycarbonates, ABS plastics and high engineering plastics may be used. It is generally preferred however, that the resin of the present compositions comprise, and preferably consist essentially of, vinyl based resin, that is, one or more polymers (including homopolymers, copolymers, terpolymers, etc.) that share the vinyl radical ($CH_2{=}CH$) as a starting structural unit. Particularly preferred is polyvinyl chloride (PVC), and in particular suspension, dispersion, emulsion or bulk PVC resins, with suspension and bulk PVC resins being preferred. In preferred embodiments, the PVC resin of the present invention has a Filentscher K-value of from about 50 to about 70, and even more preferably from about 55 to about 65.

The Reinforcing Material

The extrudable compositions of the present invention, and extrudate products prepared therefrom, comprise predominantly a resin, described in detail below, and admixed therewith, substantially homogeneously dispersed therein, a reinforcing material, also sometimes referred to herein for convenience as a "reinforcing agent". It will be appreciated also that the reinforcing material may have a wide variety of shapes, for example, fibers, chips, and particulates. Although a wide variety of reinforcing materials may be included (for example, fiber glass, talc, aramide fiber, and the like) preferably the reinforcing material comprises a cellulose material (also sometimes referred to herein for convenience as a cellulose reinforcing constituent). Examples of suitable cellulose reinforcing constituents include saw dust, wood chips, wood flour, bisal, hemp and flax. A commercially available cellulosic reinforcing fiber is, for example, 60 mesh southern yellow pine available from American Wood FiberCo.

Next will be described the various components of the preferred lubricant composition, preferred methods for the preparation of the present extrudable compositions and lubricant compositions, and then examples of lubricant compositions and their use will be presented.

Lubricant Compositions

The preferred lubricant compositions for use in extrudable compositions of the invention and for use in preparing additive compositions of the invention comprise: i) at least one oxidized polyethylene wax; ii) at least one ester wax; and iii) at least one amide wax, preferably bisamide wax.

Oxidized Polyethylene Wax Constituent

Oxidized polyethylene polymers (hereafter oxidized polyethylene or OPE) have been known as surface active materials for many years. These materials are typically prepared from an olefinic polymer, for example, polyethylene, or a "polyethylene wax" olefinic-copolymer, for example, polyethylene/polybutadiene and polyethylene/polymethacrylic acid, by subjecting the polymer or copolymer to oxidation such that oxygen functionality, for example, in the form of carbonyl functional groups, is introduced into the polymer, making it less hydrophobic. Numerous publications describe the preparation and various uses of these materials, for example, U.S. Pat. No. 6,060,565 to Deckers et al., U.S. Pat. No. 4,459,388 to Hettche et al., U.S. Pat. No. 3,322,711 to Bush et al., and U.S. Pat. No. 3,234,197 to Bauum, the disclosures and references of which are incorporated herein by reference.

Examples of these materials are available commercially, for example, the A-C® Wax series of oxidized polyethylene materials available from Honeywell International Inc. ("Honeywell").

For use in the present invention lubricant compositions, the oxidized polyethylene materials most useful have the following properties: i) Brookfield viscosities ranging from about 200 (centipoises) cps at 140° C. to about 85,000 cps at 150° C., acid numbers, as determined by either ASTM D-1386, 305-OR-1, or TMP-QCL-006 ranging from about 5 mg KOH/g of material to about 19 g KOH/g of material. It is more preferable for the oxidized polyethylene wax constituent to have a Brookfield viscosity of at least 6000 cps at 150° C., and an acid number of no greater than 20 mg. KOH/g of wax. It is preferred if the OPE component has a Brookfield viscosity at 150° C. of between about 8,500 cps to about 85,000 cps and an acid number, as determined by ASTM D 638 and D 6109 of from about 7 mg KOH/g of material to about 20 mg KOH/g of material. A commercially available material which is within this range is AC 316 oxidized polyethylene, and another is AC 307 oxidized polyethylene, both available from Honeywell.

Ester Wax Constituent

Examples of ester waxes suitable for use in the lubricant and extrudable compositions of the present invention include polymeric compounds which can be prepared by the condensation of a di- or polyfunctional carboxylic acid, for example, adipic acid, with a di- or polyfunctional alcohol, for example, pentaerytritol, in the presence of a monofunctional fatty acid, for example, stearic acid, or other monofunctional lipophilic organic acid. All of these reactants are articles of commerce.

Preparation and various uses of various ester waxes have been described, for example, in U.S. Pat. No. 6,485,804 to Nakamachi, et al., U.S. Pat. No. 5,621,033 to Lindner, U.S. Pat. No. 5,039,740 to Anderson et al., U.S. Pat. No. 4,681,975 to Hasegawa et al., U.S. Pat. No. 4,454,313 to Okitsu et al., and U.S. Pat. No. 3,972,962 to Williams et al., each of which is incorporated herein by reference. In certain preferred embodiments, ester wax suitable for use in the lubricant composition of the present invention has the following properties: acid numbers of between about 1 to about 25 mg KOH/g of ester wax; and viscosity of from about 30 centipoise at 100° C. to about 160 centipoise at 176° C.

For use in the lubricant compositions of the present invention it is preferred if the ester wax has an acid number of from about 10 mg KOH/g of wax to about 18 mg KOH/g of wax and has a viscosity of about 50 centistokes at 115° C. More preferred are ester waxes comprising the condensation product of a reaction containing pentaerythritol: adipic acid: stearic acid in the wt. ratio of about 16:14:70 with a residual acid number, as measured by ASTM D-1316 of about 12 mg KOH/g of ester wax, and has a viscosity of about 50 centistokes at about 116° C.

Ester waxes suitable for use in the lubricant composition of the present invention are available commercially from Honeywell under the trade designation Rheolub™ Specialty esters, including for example, Rheolub™ 710, Rheolub™ 830, and Rheolub™ 1800.

Other compounds which can be substituted in the present invention lubricant composition for the ester waxes described above include pentaerythritol-adipate-aleate, pentaerythritol-tetrastearate, pentaerythritol-monostreate, pentaerythritol-distearate, and mixtures of two or more thereof. Many of these are available as articles or commerce, for example, the Pentesters from Cognis.

Amide Wax Constituent

It is contemplated that amide waxes generally are available for use in accordance with the present invention. It is generally preferred, however, that the amide wax component comprises, and preferably consist essentially of, and even more preferably consist of, bisamide wax. Examples of suitable bisamide wax for use in the lubricant composition of the present invention are those which can be prepared by the condensation of a diamine, for example, ethylenediamine, with one or more species of fatty acid, for example, stearic acid. This results in a compound having di-terminal fatty acid residues bonded terminally to a central alkyl moiety via amide groups. It will be appreciated that any carboxylic acid could be used in this condensation as well as mixtures of various carboxylic acids. Additionally, any di- or polyfunctional amine could be used. All of these reactants are articles of commerce.

Preparation and various uses of various bisamide waxes have been described, for example, in U.S. Pat. Nos. 4,812,504 and 4,607,072 to Su, and U.S. Pat. No. 4,032,473 to Berg et al., the disclosures and references of which are incorporated herein by reference.

For use in the lubricant compositions of the present invention it is preferred if the bisamide wax comprises a copolymer of stearic acid and ethylenediamine with a base value of about 1 mg of KOH/g of bisamide wax, a residual acid number of from about 5 mg KOH/g of wax to about 9 mg KOH/g of bisamide wax, and has a melting point of about 138° C.

Bisamide waxes suitable for use in the lubricant composition of the present invention are available commercially as the Advawax series of waxes from Rohm & Haas Corporation. Particularly useful is Advawax™ 280.

Other known amide waxes useful in the present invention lubricant composition include eurucamide, oleocamide, and stearamide.

The lubricant compositions of the present invention preferably comprise oxidized polyethylene in an amount up to about 22 wt %, ester wax in an amount up to about 39 wt %, and amide wax in an amount up to about 39 wt %, based on the weight of the lubricant composition. For use in most extrudable compositions, lubricant compositions of the present invention will comprise: (a) from about 5.0 wt % to about 50 wt. %, preferably from about 10 wt. % to about 40 wt. %, more preferably from about 15 wt. % to about 25 wt. % of one or more oxidized polyethylene wax constituents; (b) from about 6.5 wt % to about 60 wt. %, preferably from about 20 wt. % to about 60 wt. %, more preferably from about 30 wt. % to about 50 wt. %, and even more preferably from about 35 wt. % to about 50 wt. % of one or more ester wax constituents; and (c) from about 6.5 wt. % to about 60 wt %, preferably from about 20 wt. % to about 60 wt. %, more preferably from about 30 wt. % to about 50 wt. %, and even more preferably from about 35 wt. % to about 50 wt. % of one or more amide wax (preferably bisamide wax) constituents. Compositions having amounts lying outside these ranges may also be used as required by the extrudable composition into which the lubricant composition of the present invention is to be incorporated.

In certain embodiments the lubricant compositions of the present invention comprise from about 6.5 wt % to about 22 wt. % of oxidized polyethylene constituents, from about 6.5 wt % to about 39 wt. % of one or more ester wax constituents and from about 6.5 wt. % up to about 39 wt % of one or more amide wax (preferably bisamide wax) constituents. Another preferred lubricant composition comprises from about 18 and about 19 wt % of one or more oxidized polyethylene constituents, from about 38 and about 39 wt. % of one or more ester wax constituents and from about 42 and about 43 wt. % of one or more amide (preferably bisamide) wax constituents.

It will be appreciated that, guided by known principles, values of these constituents lying outside of these preferred ranges can be employed and remain within the scope of the invention.

Additives

As mentioned above, extrudable compositions of the present invention may include also other additives typically included in extrudable compositions, preferably PVC resin, as described above, including those additives which have heat-stabilizing properties and including also those which have internal and external lubricant properties. Herein, these are termed "supplemental" to distinguishing them from the lubricant compositions of the invention which also have lubricating and heat stabilizing properties. Accordingly, the amount of lubricant composition employed and the amounts of constituents comprising the lubricant composition can be adjusted according to amount of supplemental lubricants, stabilizers, etc. in the composition in accordance with known principles.

Examples of supplemental heat stabilizers include any of the supplemental additives known to exert a dynamic heat-stabilizing effect when added to an extrudable PVC composition. Examples of supplemental heat stabilizers suitable for use in the present compositions include those generally used as heat stabilizing additives in extrudable PVC compositions, for example, compounds containing tin, for example, tin mercaptides. Other art-recognized heat stabilizers, for example, those described generally in the *Plastics Additives and Modifiers Handbook*, Ed. J. Edenbaum, Van Nostrand Reinhold, New York 1992 (which are incorporated herein by reference), for example, those based on lead-based compounds, for example, neutral lead stearate and dibasic lead phosphate. Further examples include "mixed-metal" soaps, for example calcium/zinc stearates. Additionally, heat stabilizers which are not based on heavy metal salts may be used, for example, organic-based stabilizers (OBS) from Crompton Corporation.

A further example of a supplemental additive includes a metallic soap prepared "in situ" by addition of calcium hydroxide and a fatty acid to the composition. In general, when the composition contains fatty acid and calcium hydroxide constituents, the composition is preferably prepared by blending together a wax in liquid form and a fatty acid, followed by a reaction step carried out under conditions in which at least a portion of the fatty acid is neutralized, as dictated by art-recognized variables with regard to the properties desired in the extrudable PVC composition into which the finished additive composition is to be blended. Preferably, the mixing and temperature conditions attained during the blending of the constituents of additive compositions which include a fatty acid and calcium hydroxide are adjusted to insure that the neutralization reaction between the hydroxide and the acid proceeds substantially to completion.

An example of a supplemental lubricant is polyethylene wax homopolymer. Such materials are known and are available under from Honeywell under the trade designation AC® series of wax homopolymers.

Preparation of Extrudable Compositions

The lubricant compositions of the present invention may be prepared by any known means of blending solid, semi-solid, or liquid materials with other solid, semi-solid, or liquid materials.

Conveniently, an extrudable composition can be prepared by placing an amount of resin, preferably a polyvinyl chloride resin (PVC resin) into a blending apparatus, adding in turn the reinforcing constituent(s), the desired supplemental additive constituents, for example, stabilizers, fillers, processing aids, colorants, and pigments, and other ingredients desired in the composition, and adding to the mass the present combination of lubricant constituents. As indicated above, the lubricant components which comprise the present combination can be blended separately, preferably in accordance with the proportions described above and added, in the amounts specified herein, in a single addition as a blend of the lubricant constituents to the above-mentioned resin-containing mixture. Alternatively, the individual components which comprise the present combination may be added separately, at the same time or at different times, to one or more of the other components of the extrudable composition. Any type of mixing or blending equipment on a scale from manual laboratory bench top scale, for example a hand-held motorized mixer and vessel, to motorized industrial scale processing equipment can be used. Examples of the latter type of equipment include a Henschel mixer, a ribbon blender, and a temperature controlled agitated blend tank.

It will thus be appreciated that the order of mixing the components is not critical. For example, any two or more lubricant components (including all of the lubricant components) which comprise the present lubricant combination may be prepared as an admixture which is added into an extrudable composition of the type described above, or each component may be added, either simultaneously or sequentially, to one or more of the other components of the extrudable composition of the type described above. Alternatively, the resin and various constituents of the extrudable composition could be added to one or more (including all) of the lubricant components of the present lubricant combination. Thus, all such means of bringing the components of the present extrudable composition together are contemplated by the term "adding to" used herein.

In general, the lubricant components of the present combination are present in the extrudable composition such that, in the aggregate, the amount of lubricating components is sufficient to provide an extrudable composition requiring less equilibrium torque and/or having a lower equilibrium temperature and/or increase the smoothness of the surface (gloss) of an extrudate product produced from the composition and/or provide for increased dimensional stability of an extrudate product produced from the composition, as determined by comparison with a composition which is similar except for the addition of the lubricant combination of the present invention, and at the same time preferably provides for an increase in the tensile and/or flexural strength of an extrudate product prepared from the improved extrudable composition relative to the extrudable composition which is the same except for the inclusion of a lubricant combination of the present invention. It is preferred that the lubricant combination is used in an amount that reduces equilibrium torque and/or equilibrium temperature by at least about 3% as measured in a torque rheometer. It is also preferred to add an amount of the lubricant composition providing at least about a 10% increase in tensile and/or flexural strength as measured in accordance with ASTM D 638 and D6109 respectively. Although this amount will vary, in general it is preferred if the improved composition contains, relative to 100 weight part of extrudable resin (preferably PVC resin) in the extrudable composition, up to about 0.75 weight parts (PHR) of oxidized polyethylene, up to about 1.5 PHR of ester wax, and up to about 1.5 PHR amide wax, preferably bisamide wax.

In general, the desired amounts of the various constituents of a lubricant composition will be provided to an extrudable composition by the addition of from about 0.5 to about 6 wt. parts of a lubricant composition described above per hundred weight parts of resin (PHR) in the extrudable composition, preferably from about 1 PHR to about 5.5 PHR of lubricant composition will be added to an extrudable composition and most preferably from about 2.0 PHR to about 5.0 PHR of lubricant composition will be added to the extrudable composition. Greater or lesser amounts may be used, guided by known principles and in consideration of the properties desired of the extrudable composition and the supplemental additives which may be present in an extrudable composition. For example, extrudable compositions into which the lubricant compositions of the present invention are added may also include other internal and external lubricants. Accordingly, the amount of lubricant composition employed will be adjusted to a greater or lesser amount as is warranted by the inclusion or exclusion of other lubricating components.

In one embodiment, the extrudable compositions of the present invention preferably comprise:
  (a) 100 wt. parts of one or more extrudable resins (preferably comprising and even more preferably consisting essentially of PVC resin);
  (b) from about 10 PHR to about 250 PHR, preferably from about 30 PHR to about 200 PHR, and more preferably from about 30 PHR to about 160 PHR of reinforcing agent, preferably comprising and even more preferably consisting essentially of cellulose reinforcing agent;
  (c) from about 0.1 PHR to about 3.6 PHR of amide wax (more preferably from about 0.1 PHR to about 2.1 PHR amide wax, and even more preferably from about 0.7 PHR to about 2.0 PHR amide wax), with bisamide wax being preferred;
  (d) from about 0.025 PHR to about 3 PHR of oxidized polyethylene wax (more preferably from about 0.1 PHR to about 3 PHR oxidized polyethylene wax, and even more preferably from about 0.3 PHR to about 1.3 PHR oxidized polyethylene wax);
  (e) from about 0.1 PHR to about 3.6 PHR of ester wax (more preferably from about 0.2 PHR to about 2 PHR ester wax, and even more preferably from about 0.3 PHR to about 1.3 PHR ester wax);
  (f) from about 0.4 PHR to about 2 PHR, preferably from about 0.5 to about 1.5, more preferably from about 0.6 PHR to about 1.0 PHR of one or more paraffin wax constituents;
  (g) up to about 15 PHR, preferably from about 1 PHR to about 10 PHR, more preferably from about 2 PHR to about 7 PHR of calcium carbonate;
  (h) from about 0.5 PHR to about 2.0 PHR, preferably from about 0.8 PHR to about 1.8 PHR, more preferably from about 0.8 to about 1.7 PHR of one or more tin stabilizers; and optionally one or more of the following
  (i) up to about 10 PHR, preferably from about 0.5 PHR to about 7.0 PHR, more preferably from about 0.5 to about 5.0 PHR of one or more processing aids;
  (j) up to about 15 PHR, preferably up to about 10 PHR, more preferably up to about 7 PHR of one or more modifiers;
  (k) from about 0.3 PHR to about 2.0 PHR, preferably from about 0.4 PHR to about 1.5 PHR, more preferably from about 0.5 to about 1.0 PHR of calcium stearate;
  (l) up to about 1 PHR, preferably up to about 0.5 PHR, more preferably up to about 0.1 PHR of one or more polyethylene wax homopolymer constituents.

In certain preferred embodiments the extrudable compositions of the present invention preferably comprise:
  (a) 100 wt. parts of one or more PVC resin constituents;
  (b) from about 10 wt. parts to about 250 wt. parts, preferably from about 30 wt. parts to about 200 wt. parts, and more preferably from about 30 to about 160 weight parts of one or more cellulose reinforcing constituents;
  (c) from about 0.5 PHR to about 6.0 PHR of a lubricant composition comprising:
    (i) from about 20 wt. % to about 60 wt. % of amide wax (preferably bisamide wax);
    (ii) from about 5 wt. % to about 50 wt. % of polyethylene wax constituents; and
    (iii) from about 20 wt. % to about 60 wt. % of ester wax, preferably from about 1.0 PHR to about 5.5 PHR of a lubricant composition comprising:
    (i) from about 30 wt. % to about 50 wt. % of one or more bis-amide wax constituents;
    (ii) from about 10 wt. % to about 40 wt. % of one or more oxidized polyethylene wax constituents; and
    (iii) from about 30 wt. % to about 50 wt. % of one or more ester wax constituents,
    more preferably from about 2.0 PHR to about 5.0 PHR of a lubricant composition comprising:
    (i) from about 35 wt. % to about 50 wt. % of one or more bis-amide wax constituents;
    (ii) from about 15 wt. % to about 25 wt. % of one or more oxidized polyethylene wax constituents; and
    (iii) from about 35 wt. % to about 50 wt. % of one or more ester wax constituents,
  (d) from about 0.4 PHR to about 2 PHR, preferably from about 0.5 to about 1.5, more preferably from about 0.6 PHR to about 1.0 PHR of one or more paraffin wax constituents; and optionally
  (e) up to about 15 PHR, preferably from about 1 PHR to about 10 PHR, more preferably from about 2 PHR to about 7 PHR of calcium carbonate;
  (f) from about 0.5 PHR to about 2.0 PHR, preferably from about 0.8 PHR to about 1.8 PHR, more preferably from about 0.8 to about 1.7 PHR of one or more tin stabilizers;
  (g) up to about 10 PHR, preferably from about 0.5 PHR to about 7.0 PHR, more preferably from about 0.5 to about 5.0 PHR of one or more processing aids;
  (h) up to about 15 PHR, preferably up to about 10 PHR, more preferably up to about 7 PHR of one or more modifiers;
  (i) from about 0.3 PHR to about 2.0 PHR, preferably from about 0.4 PHR to about 1.5 PHR, more preferably from about 0.5 to about 1.0 PHR of calcium stearate;
  (j) up to about 1 PHR, preferably up to about 0.5 PHR, more preferably up to about 0.1 PHR of one or more polyethylene wax homopolymer constituents.

Additive Compositons

The lubricant compositions of the present invention can be added to various supplemental, reinforcing, and resin constituents to provide for an extrudable resin composition. These lubricant compositions can be used in conjunction with existing extrudable resin compositions, for example PVC compositions, as lubricant additives which can provide also improved extrudablity properties and improved physical and mechanical properties in an extrudate product prepared therefrom. Examples of cellulose-reinforced PVC-containing extrudable compositions to which the lubricant composition of the present invention may be added to provide an extrudable composition of the present invention are described in U.S. Pat. No. 6,248,813 and U.S. Pat. No. 6,103,791 to Zehner and U.S. Pat. No. 6,210,792 to Seethamraju et al., the disclosures and references of which are incorporated herein by reference.

The above-described lubricant compositions can form the basis of an additive composition which contains in addition to the lubricant constituents, one or more supplemental additives, such as supplemental internal and external lubricants, heat stabilizers, and other constituents of extrudable PVC compositions and the variables governing the selection and amounts of these supplemental additives used in extrudable PVC compositions are described generally in the Plastics Additives and Modifiers Handbook, Ed. J. Edenbaum, Van Nostrand Reinhold, New York 1992, which is incorporated herein by reference. Preferred additive compositions comprise the above-described lubricant composition of the invention and at least one member of the group consisting of compatible supplemental lubricants and compatible supplemental heat stabilizers.

For example, in one embodiment, an additive composition of the present invention may be formulated to comprise substantially all of the constituents, except for the extrudable resin, of an extrudable composition. An additive composition of this type is preferably formulated to be mixed with only an extrudable resin, such as extrudable PVC resin, and thereby provide an extrudable PVC composition. In an alternative embodiment, an additive composition may be formulated to be added to an extrudable PVC composition as one of many additive constituents used to prepare the extrudable composition. In such an embodiment, it is preferred for the present additive composition to further comprise at least some of the most common constituents of extrudable PVC compositions, thereby providing a single additive composition which can be used in a number of different extrudable PVC compositions while reducing the number of addition processes required to prepare an extrudable PVC composition.

It is contemplated that a wide variety of components over a wide range of relative ratios will be adaptable for use in the present invention in view of the teachings contained herein.

As described above, for extrudable compositions, additive compositions of the present invention may be prepared by any known means for admixing solid, semi-solid, or liquid materials with other solid, semi-solid, or liquid materials, including techniques used for the admixture of miscible materials, for example a mixture of two or more components forming a single phase, and techniques used for blending phase separated materials to form an intimate interpenetrating structure of domain-separated regions of two or more immiscible or partially immiscible materials. As will be appreciated also, except for embodiments in which a reaction between two constituents is carried out to generate a constituent of the composition in situ, for example, the provision of a metallic soap lubricant, the various constituents of additive compositions may be blended together in any order and remain within the scope of the invention.

It will be appreciated that extrudable cellulose-reinforced PVC compositions which may be improved by the addition of a lubricant composition of the present development may comprise a wide range of components present in various amounts in accordance with known principles. The processing properties of these compositions will be improved to a varying degree with the addition of an aliquot of the lubricant composition of the present invention. Additionally, the physical properties of articles formed from these compositions will be improved with the addition of a lubricant composition of the present invention to the extrudable composition prior to forming it into an article.

The following examples are presented for the purpose of illustrating the forgoing description and are not meant to limit the scope of the claimed invention.

EXAMPLES

Compositions corresponding to a reinforced PVC resin-containing extrudable composition which does not contain a lubricant composition of the present invention (Comparative Examples A (Table I) and B (Table III)) and one which corresponds to a cellulose reinforced PVC resin-containing extrudable composition containing a lubricant composition of the present invention (Example 1, Table 1, and Example 2, Table III) were prepared with the components in the weight parts shown in Tables I and II below. The materials used to prepare the example and comparative example compositions were as follows: 1091® polyvinyl chloride resin (resin) from Georgia Gulf; TM281® tin based heat stabilizer (stabilizer) from Rohm & Haas; Rheolub® 165 paraffin wax (paraffin wax) from Honeywell, COAD 10® calcium stearate (calcium lubricant) from Norac; K120N acrylic processing aid (processing aid) from Rohm & Haas; KM334® acrylic impact modifier (impact modifier) from Rohm & Haas; UFT® calcium carbonate from OMYA (calcium carbonate); wood flour as a cellulose reinforcing component from American Wood Fiber; polyethylene wax (CS 600 from Honeywell); oxidized polyethylene wax (OPE) AC 316 A (Honeywell); Ethylene bis-stearamide (bisamide wax) Adavawax 280 (Rohm & Haas); and Rheolub 710 (ester wax) (Honeywell). All materials were used as received.

TABLE I

| Constituent | Wt. Parts relative to 100 weight parts resin | |
|---|---|---|
| | Comparative Example A | Example 1 |
| Cellulose reinforcing | 50 (vol. % of bulk) | 50 (vol. % of bulk) |
| Resin | 100 | 100 |
| Stabilizer | 1.6 | 1.6 |
| Paraffin wax | 1.0 | 0.7 |
| Polyethylene wax | — | 0.04 |
| Calcium lubricant | 1.2 | 0.7 |
| Processing aid | 1.2 | 0.5 |
| Lubricating process aid | 1.0 | — |
| Impact modifier | 5.0 | 5.0 |
| Calcium carbonate | — | 5.0 |
| OPE* | — | 0.5 |
| Ester wax* | — | 1.02 |
| Bisamide wax* | — | 1.14 |

*component of the lubricant composition of the present invention

The compositions were prepared by charging the constituent components into a Waring Blender (high intensity mixer) and heating to a temperature in excess of 105° C. while operating the mixing blades. When the components were homogeneously blended, the composition was discharged, cooled to ambient temperature and left to stand for 24 hours (aging period).

At the end of the aging period a 68 g sample of the composition was placed into a Brabender torque rheometer and subjected to rheometric analysis. As described above, each composition was subjected to rheometric analysis of the fusion and stability time, equilibrium and fusion torque and equilibrium temperature according to ASTM standard testing procedure D2538. Using this procedure, comparison of the stated rheometric properties was made between Example 1 and Comparative Example A. This comparison showed that on average the fusion temperature was 2% lower, the fusion torque was 10% less, for the extrudable composition containing a portion of a lubricating composition of the present invention than for Comparative Example A, which contained only art-recognized lubricants in typical proportions. These data show that the lubricant composition of the present invention improves the processability of an extrudable cellulose-reinforced PVC resin-containing composition.

Aliquots of each extrudable composition were used to prepare shaped articles by placing them into a twin screw extruder and forming solid rectangular profile shapes. These shapes were compression molded, cut, and milled to prepare specimens according to the ASTM standards. The specimens were then subjected to testing of the tensile and flexural strength according to ASTM D 638 and D 6109 and were visually evaluated for surface appearance. These results of this testing are present in Table 2, below.

TABLE II

| Property | Comparative Example A | Example 1 |
| --- | --- | --- |
| Tensile Strength (psi) | 5460 | 5643 |
| Elongation (%) | 5.65 | 8.82 |
| Energy (in/lb) | 423 | 514 |
| Flexural Strength (psi) | 9584 | 9634 |
| Flexural Strain (%) | 110.5 | 102.6 |
| Flexural Modulus (million psi) | 1.08 | 1.15 |

These data show that the article formed from the extrudable composition of Example 1 possessed increased tensile and flexural strength, thus demonstrating that the lubricant composition of the present invention provides both improved lubricating properties for processing the composition and improves interaction between the reinforcing material and the PVC resin in the composition.

Visual inspection of the extruded shapes showed that the comparative example extrudate was possessed of an extremely rough surface which had a "corn cob" appearance while the extrudate made from the extrudable composition of Example 1 was smooth enough to receive a surface finish as extruded.

Example 2

Improved Stability

An extrudable composition showing improved stability will be prepared by adding to an art recognized extrudable composition an aliquot of the lubricant composition of the present invention.

Thus, a lubricant composition used in Example 2 will be prepared by combining the components in the amounts shown below in Table 3 according to the above-described process. It will be found by rheologic comparison according to ASTM 2538 that the thermal stability Comparative Example B is less than that of Example 2, and the equilibrium torque of Comparative Example B is higher than that of Example 2, notwithstanding that both of the compositions have equal amounts of lubricant.

It will be found that the composition of Comparative Example B has insufficient stability to provide an extruded article. It will also be found that the extrudable composition of Example 2, which is essentially the same as Comparative Example B but with the addition the lubricant composition of the present invention, has sufficient stability to provide an extruded article therefrom. This demonstrates that the lubricant composition of the present invention can provide extrudable compositions of improved stability.

TABLE III

| | Comparative Example B | Example 2 |
| --- | --- | --- |
| Material | PHR | PHR |
| PVC Resin | 100 | 100 |
| Sn Stabilizer | 1.6 | 1.6 |
| CaCO3 | 5 | 5 |
| Impact Modifier | 5 | 5 |
| Process Aid | 0.5 | 0.5 |
| Paraffin Wax | 2.0 | 0.7 |

TABLE III-continued

| | Comparative Example B | Example 2 |
| --- | --- | --- |
| Ca Stearate | 2.0 | 0.7 |
| Low Density Oxidized Polyethylene | 0.2 | — |
| High Density Oxidized Polyethylene * | — | 0.5 |
| Pentarythritol Adipate * | — | 1.1 |
| Ethylene bis stearamide * | — | 1.1 |
| Percent Wood Flour (percentage of total mixture) | 50 | 50 |

* components of the lubricant composition of the present invention

What is claimed is:

1. An extrudable composition comprising:
   (a) thermoplastic resin;
   (b) reinforcing agent comprising cellulose;
   (c) oxidized polyethylene;
   (d) ester wax; and
   (e) amide wax.

2. The extrudable composition of claim 1 wherein said thermoplastic resin comprises polyvinyl chloride (PVC) resin.

3. The extrudable composition of claim 1 wherein said amide wax comprises bisamide wax.

4. The extrudable composition of claim 1 wherein the combination of (c), (d) and (e) components is present in an amount effective to reduce the apparent viscosity of said extrudable composition relative to the same composition in the substantial absence of said combination of (c), (d), and (e) components.

5. An extrudate product prepared from the composition of claim 4 having a tensile strength that is not substantially less than the tensile strength of an extrudate product prepared from substantially the same composition but lacking a combination of (c), (d) and (e) components in a substantial amount.

6. An extrudate product prepared from the composition of claim 4 having a flexural strength that is not substantially less than the flexural strength of an extrudate product prepared from substantially the same composition but lacking a combination of (c), (d) and (e) components in a substantial amount.

7. The extrudable composition of claim 1 comprising from about 0.1. PHR to about 3.6 PHR amide wax, from about 0.025 PHR to about 3 PHR oxidized. polyethylene wax, and from about 0.1. PHR to about 3.6 PHR ester wax.

8. The extrudable composition of claim 1 comprising from about 0.1 PHR to about 2.1 PHR amide wax, from about 0.1 PHR to about 3 PHR oxidized polyethylene wax, and from about 0.2 PHR to about 2.0 PHR ester wax.

9. The extrudable composition of any one of claims 1 to 4 wherein said oxidized polyethylene comprises a major proportion of oxidized polyethylene having an acid number of from about 7 to about 20 mg KOH/g and a viscosity of from about 8,500 to about 85,000 cP at 150° C.

10. The extrudable composition of any one of claims 1 to 4 wherein the oxidized polyethylene component has an acid number of from about 10 to about 20 mg KOH/g and a viscosity of from about 200 cps to about 1,000 cps at 150° C.

11. The composition of any one of claims 1 to 4 wherein the ester wax has an acid number of from about 10 to about 14 mg KOH/g and a viscosity of 50 cSt at 240° F.

12. The extrudable composition of any one of claims 1 to 4 wherein the amide wax has an acid number of from about 5 to about 9 mg KOH/g and a melting point of about 280° F.

13. The extrudable composition of any of claims 1 to 4 wherein said combination of components (c), (d) and (e) together comprise from about 0.5 PHR to about 6 PHR.

14. The composition of any of claims 1 to 4 wherein said combination of components (c), (d) and (e) together comprise from about 1.0 PHR to about 5.5 PHR.

15. The extrudable composition of claim 4 wherein said components (c), (d) and (e) together are present in an amount effective to improve one or more extrudability characteristics relative to the same composition but lacking said combination of components (c), (d) and (e), said one or more improved extrudability characteristics being selected from the group consisting of:
   a) decreased extrusion pressure for a given die and extrusion rate;
   b) reduced amount of stabilizer needed to achieve the same degree of stability;
   c) reduced extruder head pressure for a given die and extrusion rate;
   d) reduced extrusion torque for a given die and extrusion rate;
   e) reduced equilibrium temperature;
   f) reduced fusion torque;
   g) increased surface gloss of an extrudate product prepared from said extrudable composition; and
   h) increased dimensional stability of an extrudate product prepared from said extrudable composition.

16. The extrudable composition of claim 4 wherein said combination of components (c), (d) and (e) together are present in an amount effective to improve one or more characteristics of an extrudate product prepared from said extrudable composition relative to the same composition but lacking said combination of components (c), (d) and (e), said one or more improved characteristics being selected from the group consisting of:
   a) increased surface gloss;
   b) increased flexural strength; and
   c) increased tensile strength.

17. An extruded product made from an extrudable composition in accordance with claim 16 wherein the extruded product has an increased tensile strength relative to an extruded product prepared from the same extrudable composition but lacking any substantial amount of said combination of components (c), (d) and (e).

18. The extruded product of claim 17 wherein said increase in tensile strength is an increase of at least about 2 percent.

19. An extruded product made from an extrudable composition in accordance with claim 16 wherein the extruded product exhibits an increase in flexural strength relative to an extruded product prepared from the same extrudable composition but lacking any substantial amount of said combination of components (c), (d) and (e).

20. The extruded product of claim 19 wherein said increase in flexural strength is an increase of at least about 2 percent.

21. The extrudable composition of claim 16 wherein at least one of said effected extrudability characteristic is improved by at least about 5 percent.

22. The extrudable composition of any one of claims 1 to 4 wherein the oxidized polyethylene component has a viscosity of from about 200 cps to about 85,000 cps at 150° C.

23. The extrudable composition of any one of claims 1 to 4 wherein the oxidized polyethylene component has a viscosity of at least about 6000 cps at 150° C.

24. The extrudable composition of any one of claims 1 to 4 wherein the oxidized polyethylene component has a viscosity of from about 8,500 cps to about 85,000 cps at 150° C.

* * * * *